United States Patent
Fujisaki

(10) Patent No.: US 7,193,969 B2
(45) Date of Patent: Mar. 20, 2007

(54) ROUTER WITH PRECEDENCE CONTROL FUNCTION AND COMPUTER-READABLE MEDIUM STORING PROGRAMS

(75) Inventor: Toshihiko Fujisaki, Tokyo (JP)

(73) Assignee: NEC Corporation, Tokyo (JP)

( * ) Notice: Subject to any disclaimer, the term of this patent is extended or adjusted under 35 U.S.C. 154(b) by 916 days.

(21) Appl. No.: 09/859,462

(22) Filed: May 18, 2001

(65) Prior Publication Data

US 2002/0133496 A1 Sep. 19, 2002

(30) Foreign Application Priority Data

May 18, 2000 (JP) ............................. 2000-152682

(51) Int. Cl.
*H04L 12/26* (2006.01)

(52) U.S. Cl. ........................ 370/238; 370/351; 370/400

(58) Field of Classification Search ................ 370/351, 370/395, 42, 241, 252
See application file for complete search history.

(56) References Cited

U.S. PATENT DOCUMENTS

| 5,590,118 | A | * | 12/1996 | Nederlof ...................... 370/218 |
| 5,870,557 | A | * | 2/1999 | Bellovin et al. ............ 709/224 |
| 5,920,705 | A | | 7/1999 | Lyon et al. |
| 6,498,783 | B1 | * | 12/2002 | Lin ............................. 370/252 |

FOREIGN PATENT DOCUMENTS

| JP | 9-321795 A | 12/1997 |
| WO | WO 99/07007 A2 | 2/1999 |

* cited by examiner

*Primary Examiner*—Alpus H. Hsu
*Assistant Examiner*—Rhonda Murphy
(74) *Attorney, Agent, or Firm*—Sughrue Mion, PLLC

(57) ABSTRACT

In the event of receiving the communications IP packet (packet) from the terminal directly connected to own router 1, a device for collecting empty band related information 106 collects empty band related information of all routes available for the above-mentioned packet and stores the route determining information including the collected empty band related information, routes and precedence of the above-mentioned packet in the route storing portion 107. In the event of receiving the communications IP packet (packet) from the terminal directly connected to own router 1, the route specifying portion 108 finds all of the route determining information having precedence equal to above-mentioned communications IP packet and a route matching one of the route available for said IP packet. Then, the route specifying portion 108 selects a route having no overlapping with the route used by other packet with higher precedence and the largest empty band among the found route determining information as the route of the above-mentioned packet.

5 Claims, 9 Drawing Sheets

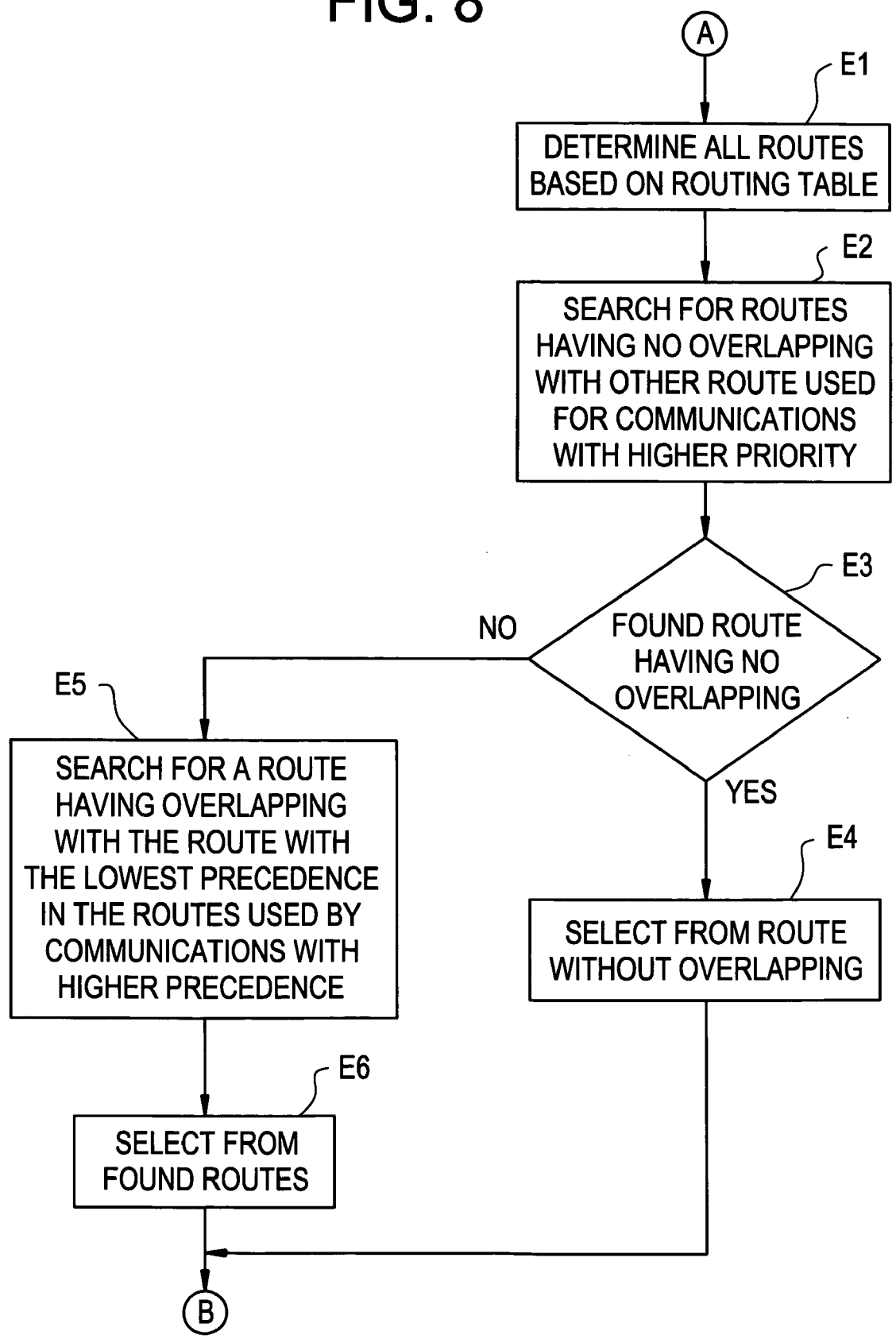

ROUTER WITH PRECEDENCE CONTROL FUNCTION AND COMPUTER-READABLE MEDIUM STORING PROGRAMS

BACKGROUND OF THE INVENTION

The present invention relates to a router, and more particularly to a router with a precedence control function capable of transmitting communications IP packets with higher precedence to destinations via routes with larger empty band.

Recently, TCP/IP network using TCP/IP (Transmission Control Protocol/Internet Protocol) is adopted not only in the information system applied to various kinds of OA devices and the like but also in the basic system applied to banking operations and the like and becomes a standard of communications as the Internet become widespread.

However, TCP/IP network is a communication system with low reliability called best effort which is not capable of precedence control of packets. That is, communications with high precedence such as moving images/voice communications and the like requiring immediacy are treated as other communications in the TCP/IP network. Therefore, a problem that long delay is developed even in the communications requiring high precedence is caused.

SUMMARY OF THE INVENTION

It is therefore an object of the present invention to provide a router with a precedence control function for minimizing delays with respect to communications with high precedence by allotting routes with larger empty band to the communications with higher precedence requiring immediacy.

In order to archive the above-mentioned object, a router with a precedence control function of the present invention provides;

means for collecting empty band related information for collecting empty band related information related to an empty band of each route existing between own router and a destination of communications IP packets in the event of receiving the communications IP packets from terminals directly connected to own router and for storing route determining information including the above-mentioned collected empty band related information, routes from which the above-mentioned empty band related information is collected and precedence of the above-mentioned communications IP packets in a route storing portion, a route specifying portion for finding all of the route determining information including routes having precedence equal to the same of the above-mentioned communications IP packet and matching at least one of the routes available for the above-mentioned communication IP packet from the above-mentioned route storing portion in the event of receiving the communications IP packets from terminals directly connected to own router and for selecting a route having a largest empty band with no overlapping with routes used by other communications IP packets with higher precedence than the above-mentioned communications IP packet among the routes in the route determining information previously found as a route for the above-mentioned communications IP packet.

According to the above-mentioned composition, the route specifying portion selects a route having a largest empty band with no overlapping with routes used by other communications IP packets with higher precedence than the above-mentioned communications IP packet among the routes available for the above-mentioned communication IP routes as a route for transmitting the communication IP packets. Therefore, routes with larger empty band are allotted to the communications IP packets with higher precedence.

BRIEF DESCRIPTION OF THE DRAWINGS

FIG. 8 is a flowchart for illustrating an example of processes of a route specifying portion 108.

DETAILED DESCRIPTION OF THE PREFERRED EMBODIMENTS

Figure 1:
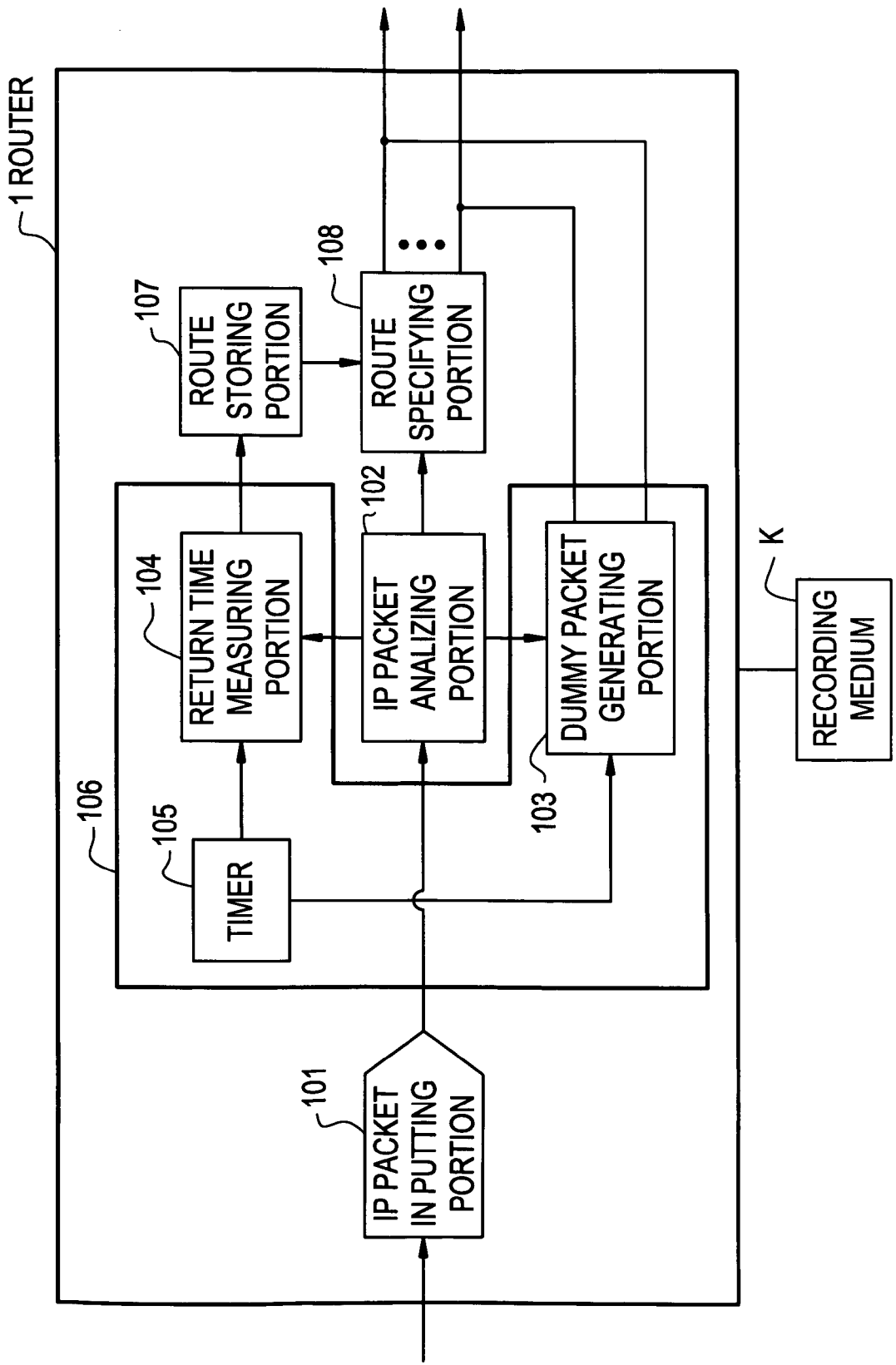
FIG. 1 is a block diagram of an embodiment of the present invention.

Referring now to the drawings, preferred embodiments of the present invention are described more particularly.

FIG. 1 is a block diagram of an embodiment of the present invention. A router 1 of the present embodiment is composed of, for example, a computer and provides an IP packet inputting portion 101, an IP packet analyzing portion 102, means for collecting empty band related information 106, a route storing portion 107, a route specifying portion 108 and a recording medium K. Means for collecting empty band related information 106 comprises a dummy packet generating portion 103, a return time measuring portion 104 and a timer 105.

The IP packet inputting portion 101 has a function for receiving IP packets delivered from a network to the present router 1.

The IP packet analyzing portion 102 has functions of (a) through (e) which will be described below.

(a) A function for determining whether an IP packet sent from the IP packet inputting portion 101 is a communications IP packet, a dummy packet or a return dummy packet.

(b) A function for outputting an instruction for generating a dummy packet with respect to the dummy packet generating portion 103, in the event that the IP packet sent from the IP packet inputting portion 101 is determined a communications IP packet, under a condition that the above-mentioned IP packet is originated from a terminal connected directly to own router 1 (a terminal connected directly to own router without mediation of other router).

(c) A function for outputting an instruction for generating a return dummy packet with respect to the dummy packet generating portion 103, in the event that the IP packet sent from the IP packet inputting portion 101 is determined a dummy packet, under a condition that the above-mentioned dummy packet is directed to own router 1.

(d) A function for sending the return dummy packet to the return time measuring portion 104, in the event that the IP packet sent from the IP packet inputting portion 101 is determined a return dummy packet, under a condition that the above-mentioned dummy packet is directed to own router 1.

(e) A function for picking up packets which is not directing to own router 1 among the communication IP packet, the dummy packet and the return dummy packet sent from the IP packet inputting portion 101 and sending them to the route specifying portion 108.

A timer 105 provided in means for collecting empty band related information 106 has a function for indicating a present time.

The dummy packet generating portion 103 has functions for;

generating and outputting dummy packets including precedence, originating time and the like with respect to each of the routes existing between own router 1 and destinations, in the event that an instruction for generating dummy packets including the destination and the precedence of the communications IP packet which is taken as a cue to generate the dummy packets is given from the IP packet analyzing portion 102 and transmitting a return dummy packet including contents of the above-mentioned dummy packet to the router from which the above-mentioned dummy packet is originated through an opposite route of the above-mentioned dummy packet, in the event that an instruction for generating the return dummy packet including contents of the above-mentioned dummy packet is given form the IP packet analyzing portion 102.

A return time measuring portion 104 has functions for calculating return time of the dummy packet based on the receiving time of a return dummy packet from the IP packet analyzing portion 102 and the time of originating the return dummy packet included therein, in the event that the return dummy packet is sent from the IP packet analyzing portion 102 and storing route determining information including the calculated return time, precedence, route included in the above-mentioned return dummy packet and the like in a route storing portion 107. Incidentally, the route storing portion 107 provides n pieces of storage regions from No.1 through No. n. And the return time measuring portion 104 uses the above-mentioned n pieces of storage regions circularly. Therefore, n pieces of the latest route determining information are stored in the route storing portion 107.

The route specifying portion 108 has a function of determining the route of the communication IP packet sent from the IP packet analyzing portion 102 utilizing the route determining information stored in the route storing portion 107, and the like.

The recording medium K includes a disk, a semiconductor memory and other recording medium, in which a program for actuating a computer as a router 1 is recorded. The program is read by the computer for implementing an IP packet inputting portion 101, IP packet analyzing portion 102, means for collecting empty band related information 106 and a route specifying portion 108 on the computer by controlling operations of the computer.

Hereafter, operations of the present embodiment will be described.

An IP packet inputting portion 101 transmits IP packets sent via a network to an IP packet analyzing portion 102, in FIG. 1.

Figure 2:
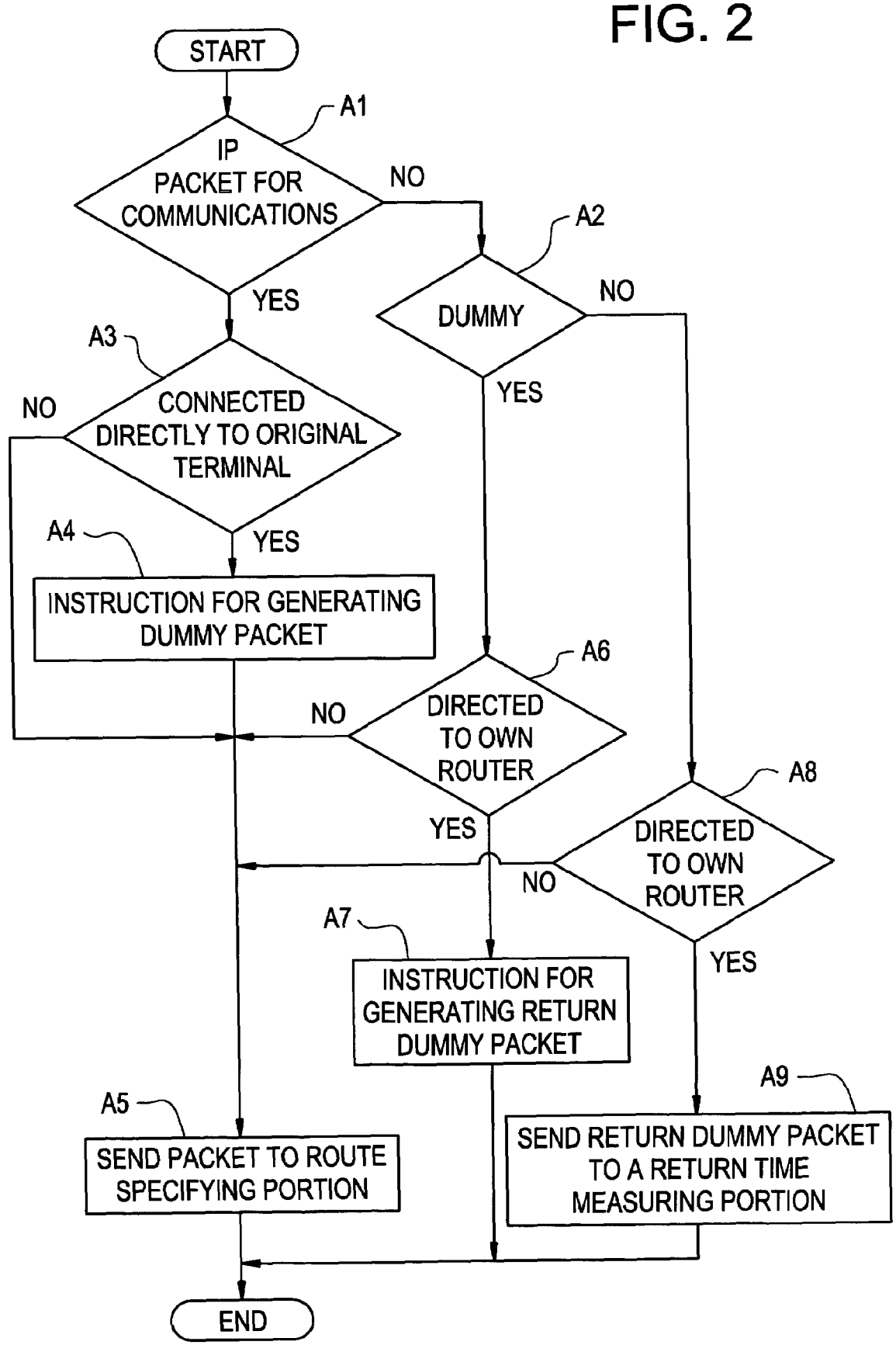
FIG. 2 is a flowchart for illustrating an example of processes of an IP packet analyzing portion 102.

The IP packet analyzing portion 102 reads a value of Identification (ID) field in the IP header of received IP packet and determines whether the received IP packet is a communication IP packet, a dummy packet or a return dummy packet (FIG. 2 A1, A2).

In the event that the above-mentioned IP packet is a communication IP packet (A1 is YES), the IP packet analyzing portion 102 determines whether the original terminal is connected directly to own router 1 or not based on IP address of original terminal included in the communication IP packet (A3).

Figure 3:
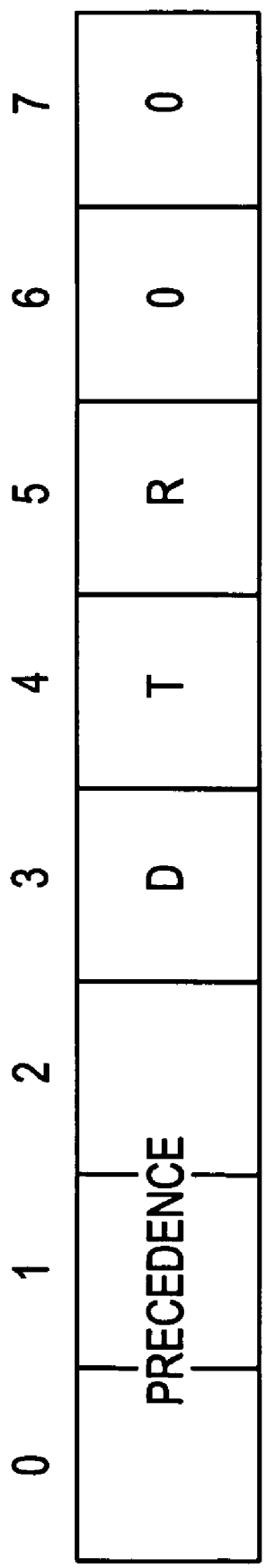
FIG. 3 is a diagram for illustrating a composition of Type of Service (TOS) field in an IP header.

And in the event that the original terminal is determined a terminal directly connected to own router 1 (A3 is YES), an instruction of generating a dummy packet including the address, the original terminal and the precedence (represented by α) of the above-mentioned communications IP packet is output with respect to the dummy packet generating portion 103 (A4). Incidentally, in the present embodiment, bit 0 through bit 2 of Type of Service (TOS) field in the IP header are provided as a precedence sub field, as shown in FIG. 3 and the precedence of the communication IP packet is indicated by the value (the larger the value is, the higher the precedence is) set therein.

Figure 4:
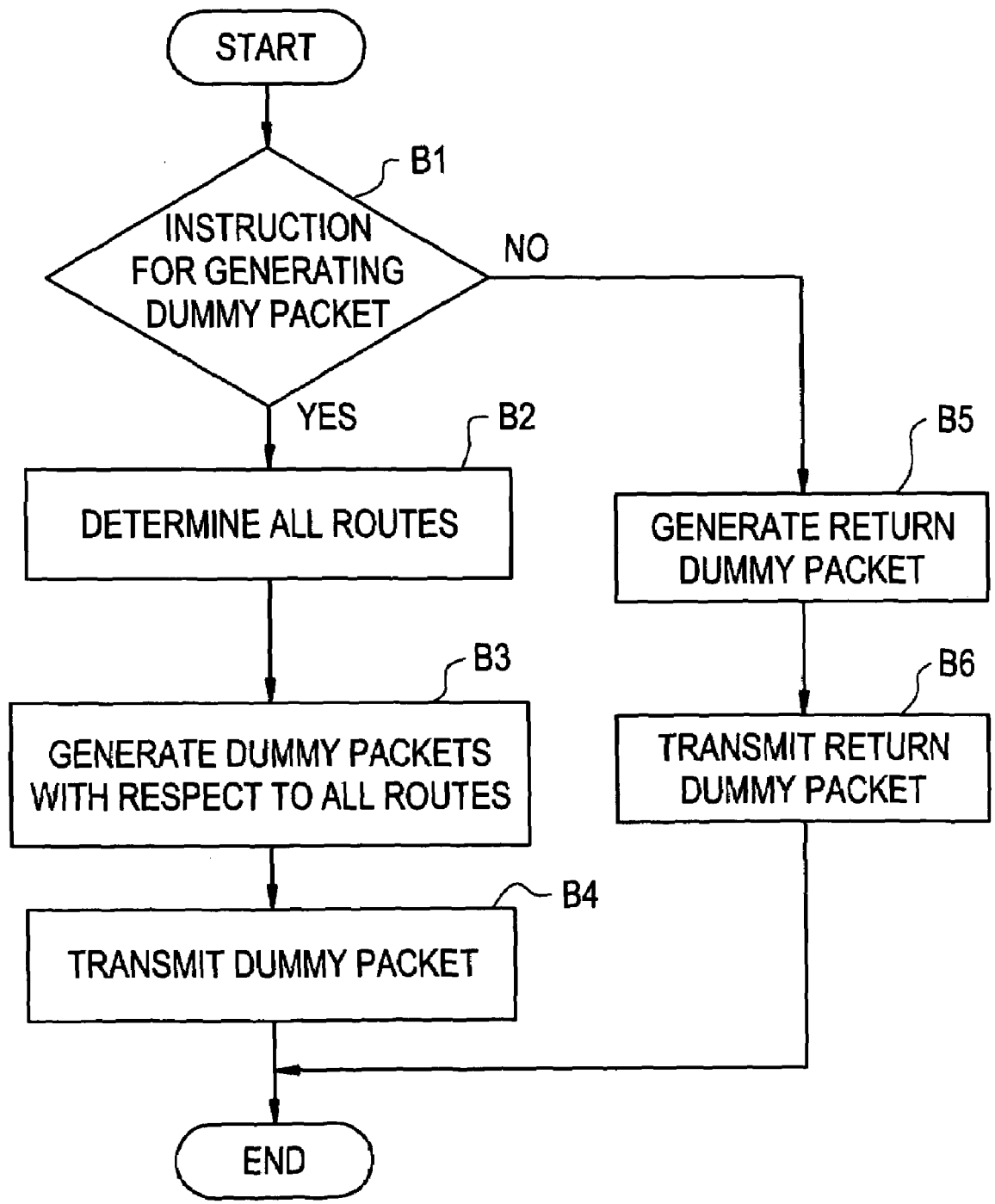
FIG. 4 is a flowchart for illustrating an example of processes of a dummy packet generating portion 103.

When an instruction of generating a dummy packet is given, the dummy packet generating portion 103 determines all of the routes existing between the destination included in the above-mentioned dummy packet and own router 1 based on, for example, a routing table (not shown) (FIG. 4 B1 is YES, B2).

Figure 5:
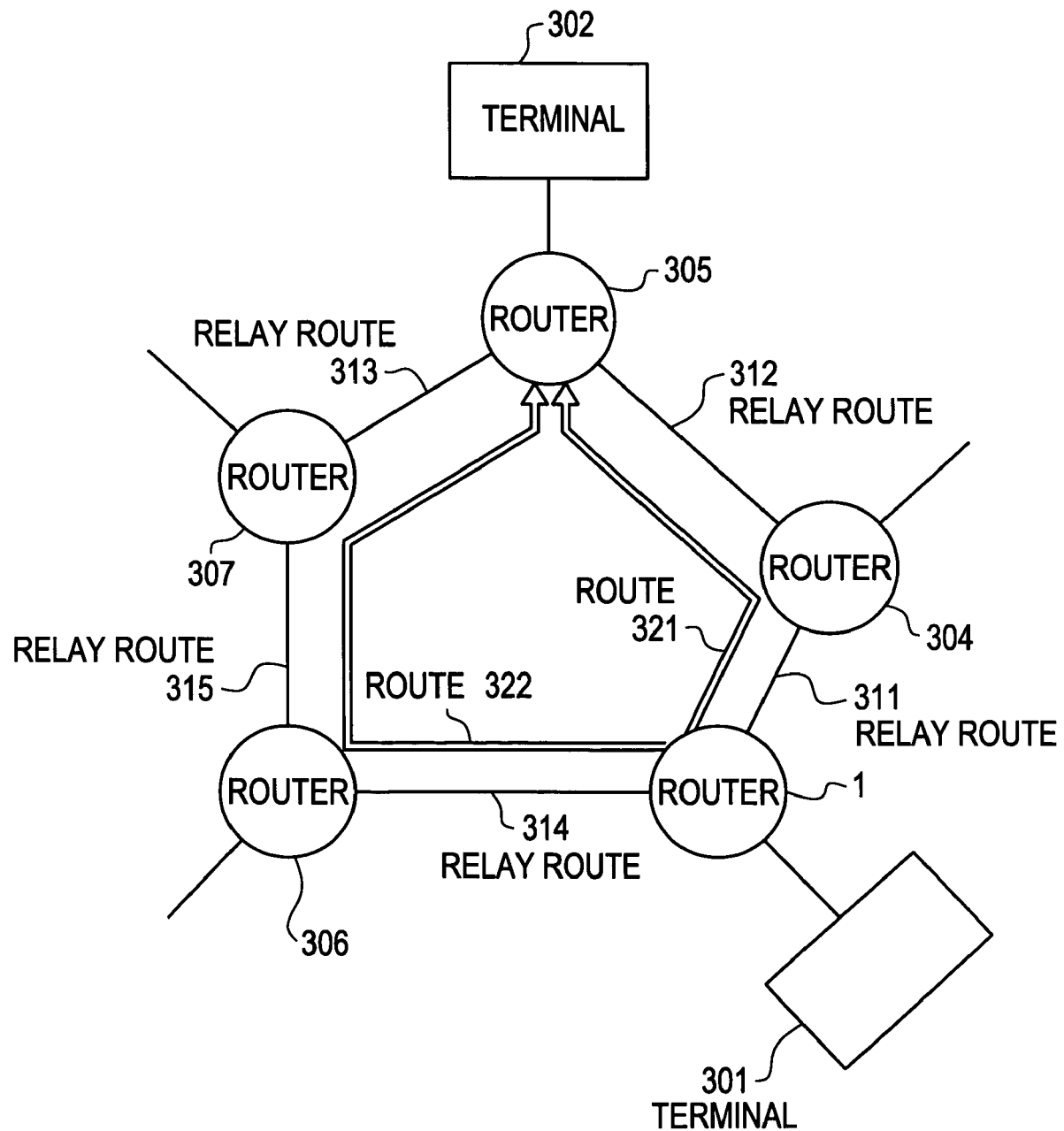
FIG. 5 is a diagram for illustrating operations of routers.

Here, a destination included in an instruction for generating a dummy packet is assumed to be, for example, a terminal 302 shown in FIG. 5, the dummy packet generating portion 103 in the router 1 determines two routes of 321 departing from the router 1 to a router 305 via a router 304 and 322 departing from the router 1 to the router 305 via routers 306 and 307. Incidentally, the routers 1, 304 through 307 are connected successively to each other by relay routes 311 through 315 therebetween.

Thereafter, the dummy packet generating portion 103 generates dummy packets DP1 and DP2 with respect to the above-mentioned two routes of 321 and 322 respectively (B3). In the above-mentioned event, the dummy packet DP1 with respect to the route 321 is determined that the destination is the router 305, the origin of transmission is the router 1 and the route departs from router 1 to the router 305 via the router 304. And an originating time (present time T1 indicated by the timer 105), a precedence α of the communications IP packet which is taken as a cue to generate the dummy packet DP1 and an IP address of the terminal 302 which is a destination of the communications IP packet are included in a data portion of the dummy packet generating portion 103. On the other hand, the dummy packet DP2 with respect to the route 322 is determined that the destination is the router 305, the origin of transmission is the router 1 and the route departs from router 1 to the router 305 via the routers 306 and 307. And an originating time T1, a precedence α of the communications IP packet and an IP address of the terminal 302 which is a destination of the communications IP packet are included in a data portion thereof. Thereafter, the dummy packet generating portion 103 transmits dummy packets DP1 and DP2 with respect to the routes 321 and 322 generated at B3 to the routes respectively (B4).

The routers 304 through 307 shown in FIG. 5 have the similar compositions as the router 1, in which an IP packet analyzing portion 102 in the router 304 send a dummy packet DP1 to a route specifying portion 108 (A5), as the dummy packet transmitted from the router 1 (FIG. 2 A1 is NO, A2 is YES) is not a dummy packet directed to own router 304 (A6 is NO). Accordingly, the route specifying portion 108 in the router 304 transmits the dummy packet DP1 to the router 305 based on the route in the dummy packet DP1.

The IP packet analyzing portion 102 in the router 305 outputs an instruction for generating a return dummy packet with respect to the dummy packet DP1 with respect to the dummy packet generating portion 103 in own router 305 (A7), as the dummy packet transmitted from the router 304 (A1 is NO, A2 is YES) is a dummy packet addressed to own router 305 (A6 is YES). The instruction for generating the return dummy packet includes the destination of the dummy packet DP1 (the router 305), the origin of transmission (the router 1), the route 321 (from the router 1 to the router 305 via the router 304) and contents of the data portion (the originating time T1, the precedence α of the communication IP packet and the IP address of the terminal 302 as a destination of the communications IP packet).

The dummy packet generating portion 103 in the router 305 generates a return dummy packet RDP1 (FIG. 4 B1 is NO, B5) when an instruction for generating the return dummy packet with respect to the dummy packet is given. The above-mentioned return dummy packet RDP1 is determined that the destination is the address of the router 1, the origin of transmission is the address of the router 305 and the route departs from router 305 to the router 1via the router 304 (the reverse of the route included in the generating instruction). And the originating time T1, the precedence α of the communications IP packet and the IP address of the terminal 302 which is a destination of the communications IP packet are included in a data portion thereof. Thereafter, the dummy packet generating portion 103 in the router 305 transmits the above-mentioned generated return dummy packet RDP1 to the router 304 on the route 321 (B6). The return dummy packet RDP1 is transmitted to the router 1 via the router 304 (FIG. 2 A1, A2 and A8 are NO, A5). And the router 305 performs the similar operation as the above-mentioned operation of the dummy packet DP1, in the event of receiving a dummy packet DP2 via the route 322, that is, the router 305 generates a return dummy packet RDP2 with respect to the dummy packet DP2 and transmits the dummy packet DP2 in a route departing from the router 305 to the router 1 via the routers 307 and 308.

When the IP packet analyzing portion 102 in the router 1 receives the return dummy packet RDP1 from the PI packet inputting portion 101 (FIG. 2 A1 and A2 are NO), the IP packet analyzing portion 102 sends the return dummy packet RDP1 to the return time measuring portion 104 (A9) according to the determination that the return dummy packet RDP1 is directed to own router 1(A8 is YES).

Figure 6:
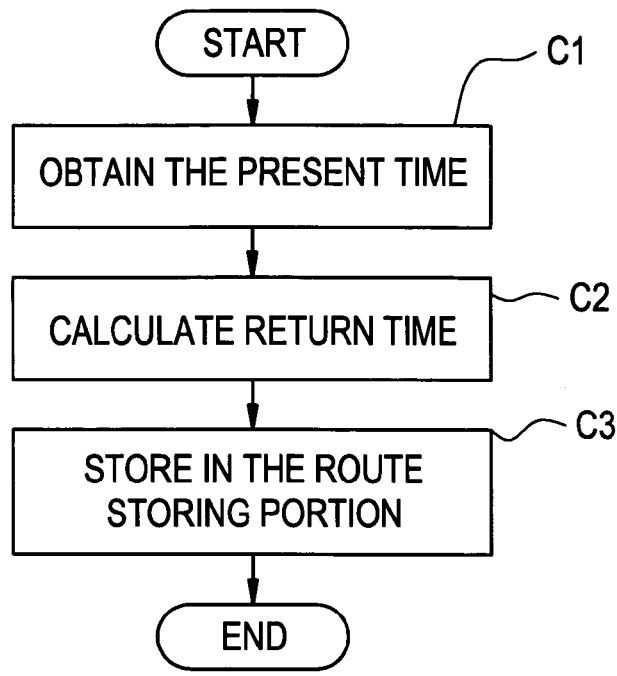
FIG. 6 is a flowchart for illustrating an example of processes of a return time measuring portion 104.

When the return time measuring portion 104 receives the return dummy packet RDP1, the return time measuring portion 104 obtains the present time T2 indicated by the timer 105 (FIG. 6 C1) and determines the return time (T2−T1) based on the above-mentioned present time T2 and the originating time T1 included in the return dummy packet RDP1 (C2). Thereafter, the return time measuring portion 104 stores the route determining information including the above-mentioned return time (T2−T1), the precedence α included in the return dummy packet RDP1, the destination (the IP address of the terminal 302) and the route 321 (departing from the router 1 to the router 305 via the router 304) in the route storing portion 107 (C3). And in the event of receiving the return dummy packet RDP2, the return time measuring portion 104 performs the similar process as the event of return dummy packet RDP1.

In the event of receiving the IP packet in which a route is programmed by the IP packet analyzing portion 102, the route specifying portion 108 in the router 1 transmits the IP packet according to the route. On the contrary, in the event of receiving the IP packet in which the route is not programmed (the communications IP packet originated from a terminal directly connected to the router 1), the route specifying portion 108 performs the process as shown in a flowchart of FIG. 7 and FIG. 8.

Figure 7A:
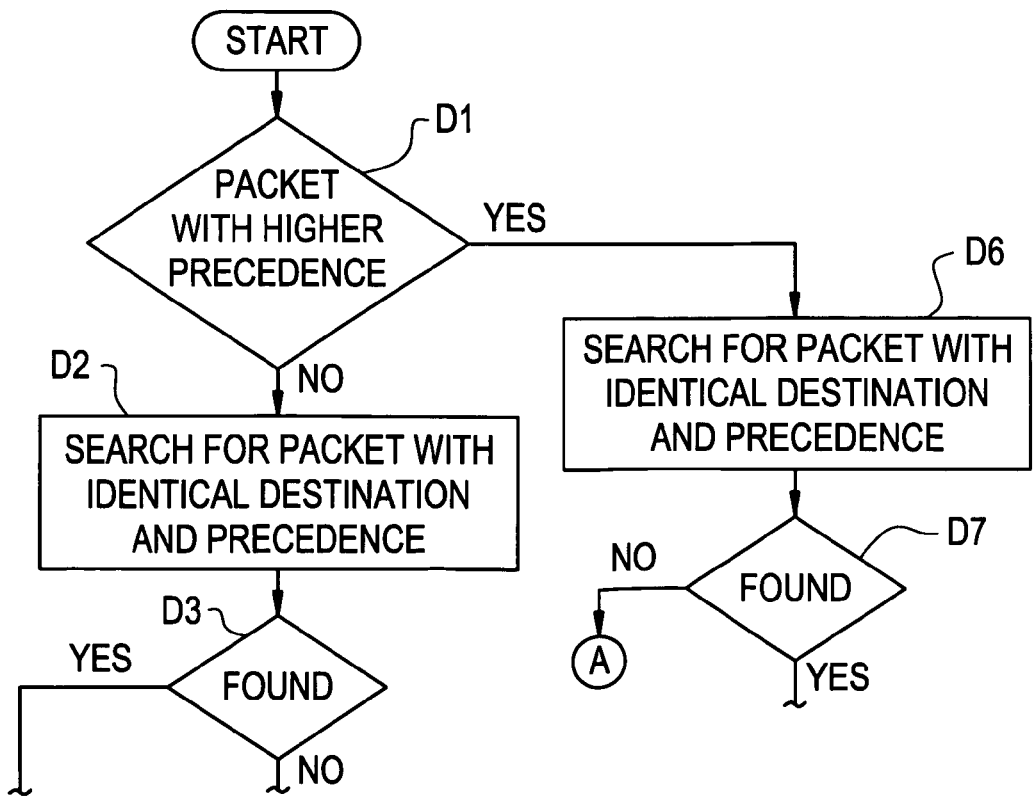
FIG. 7 is a flowchart for illustrating an example of processes of a route specifying portion 108.
Figure 7B:
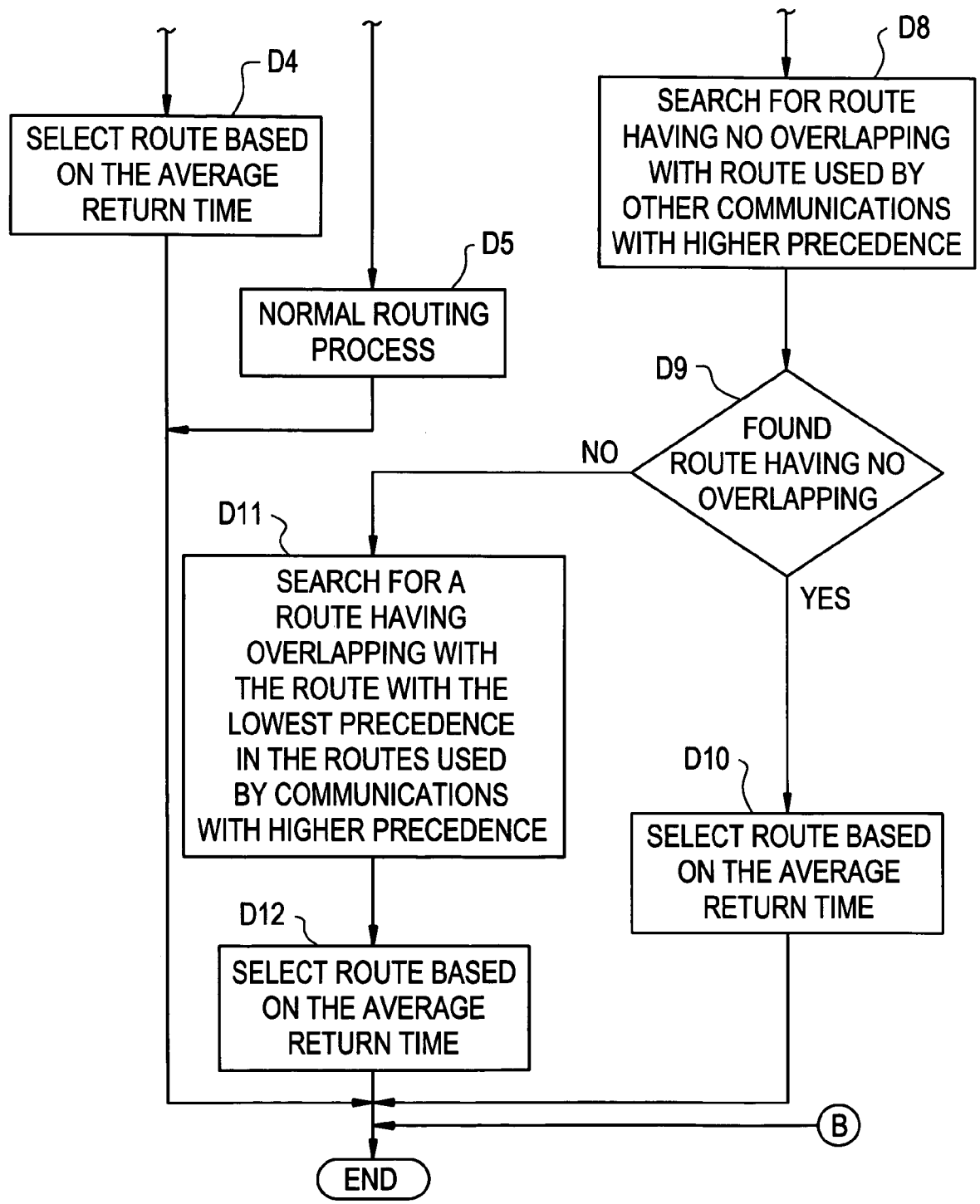

For example, now, a communications IP packet in which a route is not set determined that the origin of transmission is a terminal 301 shown in FIG. 5, the destination is a terminal 302 shown in FIG. 5 and the precedence is α is assumed to be received, the route specifying portion 108 in the router 1 determines whether the route determining information with higher precedence than the precedence α of the above-mentioned communications IP packet is stored in the route storing portion 107 or not (FIG. 7, D1).

In the event that no route determining information as mentioned above is stored in the route storing portion 107 (D1 is NO), the route specifying portion 108 retrieves the route storing portion 107 and finds all of the route determining information of the precedence and the destination identical to the precedence α and the destination (the terminal 302) of the above-mentioned communications IP packet (D2). And in the event that no route determining information as mentioned above is found (D3 is NO), the communication IP packet is transmitted in normal routing processes.

On the contrary, in the event that the route determining information of the precedence α and the destination (the terminal 302) is found, an average of return time of the dummy packet is determined by each route in the above-mentioned route determining information and a route with the shortest average return time is selected as a route with the largest empty band (D4). Further, at D4 in FIG. 7, a communications IP packet having a selected route programmed therein is transmitted to the route and an occupied flag for indicating the route is occupied is set on a route identical to the route selected at D4 in the route determining information found at D2. Now, for example, two route determining information are assumed to be stored in route storing portion 107 as the route determining information whose precedence is α and destination is the terminal 302, in which one of the route determining information determines the route departs from the router 1 to the router 305 via the router 304 and the return time of Ta and the other determines the route departs from the router 1 to the router 305 via the routers 306 and 307 and the return time of Tb (Ta<Tb), the route specifying portion 108 selects the route 321 (from the router 1 to the router 305 via the router 304) with shorter return time. And an occupied flag is set on one of the above-mentioned route determining information which determines the route departs from the router 1 to the router 305 via the router 304.

And in the event it is determined that the route storing portion 107 stores route specifying information with higher precedence than the precedence α of the above-mentioned IP packet (D1 is YES), the route specifying portion 108 retrieves the route storing potion 107 to find all of the route specifying information with identical precedence and destination to the precedence α and the destination (terminal 302) of the above-mentioned IP packet (D6). In the event the route determining information as mentioned above is found (D7 is YES), the route specifying portion 108 further finds route determining information with no overlapping used by other IP packet providing higher precedence than the above-mentioned communications IP packet (D8). Here, the route used for communications of the above-mentioned other IP packet can be determined based on the route determining information on which the occupied flag is set. And in the event the route determining information including route with no overlapping (D9 is YES), an operation of determining the average of return time of the dummy packet by each route in the found route determining information, selecting a route with shortest average return time and the like is performed in the same manner as D4 (D10).

Figure 9:
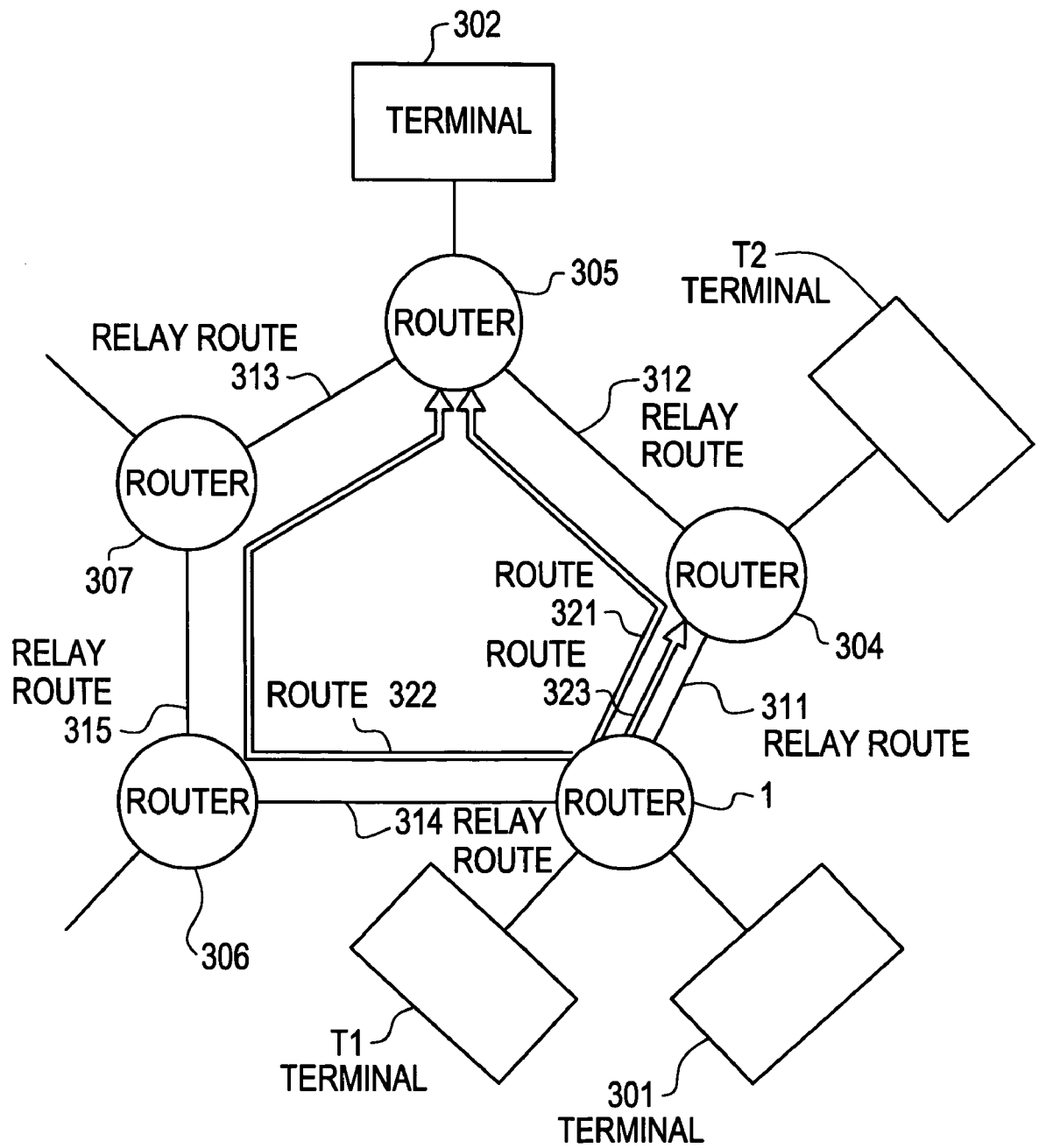
FIG. 9 is a diagram for illustrating operations of routers.

Here, route determining information including a route departing form the router 1 to the router 305 via the router 304 and return time of Ta and another route determining information including a route departing form the router 1 to the router 305 via the routers 306 and 307 and return time of TB (Ta<Tb) is assumed to be stored as route determining information with precedence of α and a destination of terminal 302 in the route storing portion 107. At the same time, route determining information including a route departing from the router 1 to the router 304 (a route used for transmitting packets from the terminal T1 to the terminal T2) is assumed to be stored as the route determining information on which the occupied flag is set with precedence higher than α in the route storing portion 107. In the event mentioned above, the route specifying portion 108 selects the route departing from the router 1 to the router 305 via the routers 306 and 307 (cf. FIG. 9). That is, the route 321 has overlapping with the route 323 used by other communications IP packet with precedence higher than the above-mentioned IP packet, though return time of a dummy packet is shorter via the route 321 than via the route 322. Accordingly, the route specifying portion 108 selects the route departs for the router 1 to the router 305 via the routers 306 and 307.

On the other hand, in the event of not finding the route determining information including a route without overlapping at D8 (D9 is NO), the route specifying portion 108 finds routes fulfilling conditions as follows among the route determining information found at D6 (D11). "Condition: route determining information including a route having overlapping with the route in the route determining information with the lowest precedence in the route determining information with precedence higher than precedence α of the communications IP packet which is determining a route currently".

Thereafter, the route specifying portion 108 determines the route by the process similar to D4 focusing only on the route determining information found at D11.

Further, in the event of not finding the route determining information with the identical destination and precedence identical to the destination (terminal 302) and the precedence α included in the communications IP packet at D6 (FIG. 7, D7 is NO), all of the routes available for the above-mentioned communications IP packet are determined based on the routing table (FIG. 8 E1). Then, the route determining information including routes without overlapping with route used by the other communication IP packet with precedence higher than the above-mentioned communication IP packet is found among the route determining information determined at D1 (E2). And in the event of finding the above-mentioned route determining information (E3 is YES), the route with the smallest number of hop is selected among the routes in the found route determining information and then the communications IP packets is transmitted through the selected route (E4). Further, processes such as setting an occupied flag on the route determining information including the selected route and embedding the selected route in the communications IP packet are performed.

On the contrary, in the event of not finding the route determining information including the route without overlapping (E3 is NO), route determining information fulfilling conditions as follows is found in the route determining information determined at E1 (E5). "Condition: route determining information including a route having overlapping with the route in the route determining information with the lowest precedence in the route determining information with precedence higher than precedence α of the communications IP packet which is determining a route currently".

Thereafter, the route with the smallest number of hop is selected among the routes in the found route determining information at E5 and the process such as transmitting communications IP packets to the selected route and the like is performed in the same manner as E4 (E6).

Incidentally, the IP packet analyzing portion 102 is planed to output an instruction for generating dummy packets with respect to the dummy packet generating portion 103 at each time when the communications IP packet is sent from the terminal directly connected to own router via the IP packet inputting portion. However, the instruction for generating dummy packets can be output at each time when a plurality of the above-mentioned communications IP packets are sent. As the result, the traffic volume on the network can be lowered by reducing the number of dummy packets.

As it has been described above, the present invention provides a route specifying portion for selecting routes without overlapping with the route used by other communication IP packet with precedence higher than the above-mentioned IP packet, with the largest empty band among the routes available for the above-mentioned communications IP packet as the route for transmitting the communications IP packet. Therefore, it becomes possible to allot routes with larger empty band to the communications IP packets with higher precedence. As the result, delay in transmitting communication IP packets with high precedence for transmitting data requiring real-time reproducing such as images, voices and the like can be minimized.

What is claimed:

1. A router with a precedence control function comprising:
   means for collecting empty band related information related to an empty band of each route existing between an own router and a destination of a communications IP packet, and for storing route determining information including the collected empty band related information, a route from which said empty band related information is collected, and precedence of said communications IP packet in a route storing portion, in the event of receiving the communications IP packet from a terminal directly connected to the own router; and
   a route specifying portion for finding all of the route determining information having precedence equal to said communications IP packet and matching a route of the routes available for said communications IP packet and selecting a route having no overlapping with a route used by another packet with precedence higher than said communications IP packet and said route having the largest empty band among routes in the found route determining information as the route of said communications IP packet, in the event of receiving the communications IP packet from a terminal directly connected to the own router.

2. The router with a precedence control function as claimed in claim 1, wherein said empty band related information is a return time of dummy packets.

3. The router with a precedence control function as claimed in claim 1, wherein said means for collecting empty band related information comprises:

a dummy packet generating portion for transmitting a dummy packet requiring a return dummy packet in which each route available for said communications IP packet includes originating time, precedence and a route of said communications IP packet and a last router includes said originating time, precedence and the route, in the event of receiving a communications IP packet from a terminal directly connected to the own router, a return time measuring portion for calculating a return time of the dummy packet based on a time when the dummy packet was originated and a time when said return dummy packet is received, in the event of receiving the return dummy packet, and storing the route determining information including said calculated return time, precedence of said return dummy packet and the route of said return dummy packet in said route storing portion.

4. The router with a precedence control function as claimed in claim 3, wherein said dummy packet generating portion transmits the dummy packet at each time when a predetermined number of communication IP packets are received from a terminal directly connected to the own router.

5. A machine-readable recording medium for recording a program executed by a computer for a router comprising;

means for collecting empty band related information related to an empty band of each route existing between a computer for an own router and a destination of a communications IP packet, and for storing route determining information including the collected empty band related information of each route, a route from which said empty band related information is collected and precedence of said communications IP packet in a route storing portion, in the event of receiving the communications IP packet from a terminal directly connected to the computer for the own router; and a route specifying portion for finding all of the route determining information having precedence equal to said communications IP packet and matching a route of the routes available for said communications IP packet and selecting a route having no overlapping with a route used by another packet with precedence higher than said communications IP packet and said route having the largest empty band among routes in the found route determining information as the route of said communications IP packet, in the event of receiving the communications IP packet from a terminal directly connected to the computer for the own router.

* * * * *

UNITED STATES PATENT AND TRADEMARK OFFICE
CERTIFICATE OF CORRECTION

PATENT NO. : 7,193,969 B2  Page 1 of 1
APPLICATION NO. : 09/859462
DATED : March 20, 2007
INVENTOR(S) : Toshihiko Fujisaki It is certified that error appears in the above-identified patent and that said Letters Patent is hereby corrected as shown below:

Col. 1, line 17, delete "become" and insert --becomes--

Col. 10, Claim 5, line 13, delete "an other" and insert --another--

Claim 5, line 25, delete "machine-readable recording medium for recording" and insert --computer-readable medium for storing--

Claim 5, line 26, delete "for actuating" and insert --executed by--

Claim 5, line 26, delete "as;" and insert --comprising:--

Signed and Sealed this

Ninth Day of December, 2008

JON W. DUDAS
*Director of the United States Patent and Trademark Office*